United States Patent [19]
Otsuka et al.

[11] Patent Number: 5,732,998
[45] Date of Patent: Mar. 31, 1998

[54] DRAIN CLIP FOR WEATHER STRIP AND WEATHER STRIP WITH A DRAIN CLIP

[75] Inventors: Hiroyuki Otsuka, Chiba-ken; Yasuo Yamamoto, Kanagawa-ken, both of Japan

[73] Assignees: Kinugawa Rubber Ind. Co., Ltd., Chiba-Ken; NIFCO, Inc., Kanagawa-Ken, both of Japan

[21] Appl. No.: 548,130

[22] Filed: Oct. 25, 1995

[30] Foreign Application Priority Data

Nov. 17, 1994 [JP] Japan ................................. 6-308167

[51] Int. Cl.$^6$ .......................................... B62D 25/00
[52] U.S. Cl. ........................... 296/208; 49/476.1; 49/493.1
[58] Field of Search .......................... 296/146.9, 206, 296/208, 76; 49/476.1, 493.1, 490.1, 492.1

[56] References Cited

FOREIGN PATENT DOCUMENTS 2 103 268 A  2/1983  United Kingdom .

Primary Examiner—David M. Mitchell
Assistant Examiner—Hoa B. Trinh
Attorney, Agent, or Firm—Sughrue, Mion, Zinn, Macpeak & Seas

[57] ABSTRACT

The present invention provides a drain clip for use in combination with a weather strip for an automobile to drain water leaked into the weather strip attached to the flange of the body of the automobile, capable of being securely attached to a weather strip at a predetermined position on the weather strip so that the drain clip may not fall off the weather strip or may not be dislocated, and of improving the efficiency of the work for attaching the weather strip to the body of an automobile. The drain clip has a base part having an L-shaped cross section and provided in its outer surface with a drain groove formed so as to extend from one to the other end thereof. One of the legs of the drain clip is inserted between the flange of the body of the automobile and the weather strip put on the flange to form a drain passage connecting the internal space of the weather strip and the external environment. Bar-shaped holding arms project slightly obliquely inward and in opposite directions from the opposite side edges of one of the legs of the base part, respectively, so as to be engaged with one of the inner holding lips of the weather strip with their tips pressed against the inner surface of the weather strip.

8 Claims, 6 Drawing Sheets

DRAIN CLIP FOR WEATHER STRIP AND WEATHER STRIP WITH A DRAIN CLIP

BACKGROUND OF THE INVENTION

The present invention relates to a drain clip to be attached to a weather strip of rubber to seal the joint of the body of an automobile, and a trunk lid, a door or a window glass in a water-tight fashion, and to a weather strip provided with such a drain clip.

A rubber weather strip a as shown in FIG. 10 is attached to the periphery of the trunk compartment, the door opening or the window of an automobile to seal the joint of the body of the automobile and a trunk lid, a door or a window glass in a water-tight fashion. Shown in FIG. 10 is the trunk compartment of a hatchback automobile.

As shown in FIG. 12, the weather strip a is an integral rubber strip having a body part b having a cross section substantially resembling an inverted letter U, holding lips c1 to c4 projecting toward each other from the inner side surfaces of the body part b, and a tubular sealing part d integrally joined to the upper wall of the body part b. The weather strip a is put on a flange f formed on the body e of an automobile so that the flange f is received in the body part b and is nipped between the opposite holding lips c1 to c4. The tubular sealing part d is elastically compressed by the trunk lid, the door or the window glass to seal the joint of the body e of the automobile and the trunk lid, the door or the window glass in a water-tight fashion.

When water leaks into the interval space of the body part b of the weather strip a or dew forms in the internal space of the body part b, the water stays in the weather strip a because the internal space of the weather strip a is substantially sealed, which causes the flange f to rust and the rubber forming the weather strip a to deteriorate. A drain clip for draining the water from the weather strip a is attached to the weather strip a to avoid such problems.

A drain clip i disclosed in U.S. Pat. No. 4,461,507 has a base plate g having an L-shaped cross section provided in its outer surface, i.e., the surface having an outer corner, with a drain groove h extending from one to the other end of thereof as shown in FIG. 11. As shown in FIG. 12, one leg of the drain clip i is inserted between the flange f of the body e and one side wall of the body part b of the weather strip a to enable the internal space of the body part b to communicate with the external environment by means of the drain groove h so that the water collected in the internal space of the body b of the weather strip a drains away through the drain groove h.

This drain clip i, however, causes a problem in attaching the same to the weather strip a. When using the drain clip i in combination with the weather strip a, in view of the efficiency of the weather strip attaching work, the drain clip i is attached to the weather strip a, and then the weather strip a combined with the drain clip i is put on the flange f of the body e of the automobile. However, in some cases, the drain clip i is dislocated out of place or falls off the weather strip a when the weather strip a is put on the flange f. Therefore, the weather strip attaching work must be carefully carried out so that the drain clip i may not be dislocated or may not fall off, which impedes the weather strip attaching work.

SUMMARY OF THE INVENTION

The present invention has been made in view of the aforesaid problems and it is therefore an object of the present invention to provide a drain clip for a weather strip, capable of surely forming a drain passage connecting the internal space of the weather strip and the external environment, of enabling the water collected in the internal space of the weather strip to drain satisfactorily, of being securely attached in place to the weather strip and of facilitating work for attaching the weather strip to the body of an automobile, and to provide a weather strip provided with such a drain clip.

With the foregoing object in view, the present invention provides a drain clip for draining water leaked into a weather strip attached to the flange of the body of an automobile, comprising, in an integral unit, a base part having an L-shaped cross section and provided in its outer surface with a drain groove formed so as to extend from one to the other end thereof, one of the legs of the drain clip being inserted between the flange of the body of the automobile and the weather strip put on the flange to form a drain passage connecting the internal space of the weather strip and the external environment, and bar-shaped holding arms projecting slightly obliquely inward and in opposite directions from the opposite side edges of one of the legs of the base part, respectively, so as to be engaged with one of the inner holding lips of the weather strip with their tips pressed against the inner surface of the weather strip.

Preferably, the drain clip of the present invention is provided with a turn-stop projection at the middle of the width of one of the legs of the base part. The drain clip may be provided with tilting projections on the outer surface of one of the legs of the base part thereof.

The aforesaid weather strip to be used in combination with the drain clip of the present invention may comprise a body part having a cross section resembling an inverted letter U and integrally provided on the inner surfaces of the side walls thereof with holding lips, and a sealing part integrally joined to the outer surface of the base part. The drain clip is attached to the weather strip with one of the legs of the base part of the drain strip inserted in the body part of the weather strip, the holding arms thereof in engagement with the holding lip formed in the lower part of the outer side wall of the body part of the weather strip and the tips of the holding arms pressed against the inner surface of the outer side wall of the body part of the weather strip, and the weather strip combined with the drain clip can be put on the flange of the body of an automobile.

The drain clip of the present invention for use in combination with a weather strip for an automobile is attached to the weather strip with one of the legs thereof inserted between the flange of the body of the automobile and the weather strip so as to form a drain passage connecting the internal space of the weather strip and the external environment by the drain groove to drain water collected in the internal space of the weather strip through the drain passage. The bar-shaped holding arms of the drain clip projecting slightly obliquely inward and in opposite directions from the opposite side edges of one of the legs of the base part, respectively, prevent the drain clip from falling off the weather strip or from being dislocated from a predetermined position when the weather strip is attached to the flange of the body of the automobile, which facilitates the work for attaching the weather strip to the flange of the body of the automobile.

When the drain clip is attached to the weather strip by inserting one of the legs of the body part in the internal space of the weather strip, the holding arms projecting slightly obliquely inward and in opposite directions from the opposite side edges, respectively, of the leg of the base part engage with the inner holding lip of the weather strip to ensure that the drain clip does not fall off the weather strip, and the tips of the holding arms are pressed against the inner side surface of the weather strip to ensure that the drain clip will not be dislocated from the predetermined position.

Therefore, when attaching the weather strip to the body of the automobile after attaching the drain clip to the weather strip, the drain clip will not fall off the weather strip and will not be dislocated from the predetermined position. Thus the weather strip having a draining structure can be securely and easily attached to the body of the automobile and facilitates the weather strip attaching work.

Preferably, the drain clip of the present invention is provided with a turn-stop projection at the middle of the width of one of the legs of the base part so that the turn-stop projection may interfere with the inner holding lips or the inner side surface of the weather strip to restrain the drain clip from turning relative to the weather strip. When attaching the weather strip combined with the drain clip to the flange of the body of the automobile, a difficulty in inserting the flange in the weather strip due to the angular dislocation of the drain clip can be avoided, which facilitates the weather strip attaching work.

The drain clip of the present invention may be provided on the outer surface of one of the legs of the body part thereof with tilting projections to tilt one of the legs of the body part of the drain clip inserted in the weather strip toward the inner side surface of the weather strip so that the holding arms may firmly engage with the holding lips of the weather strip, and the tips of the holding arms may be pressed against the inner side surface of the weather strip. The turn-stop projection prevents the excessive tilting of the drain clip which makes the drain clip attaching work difficult.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 10:
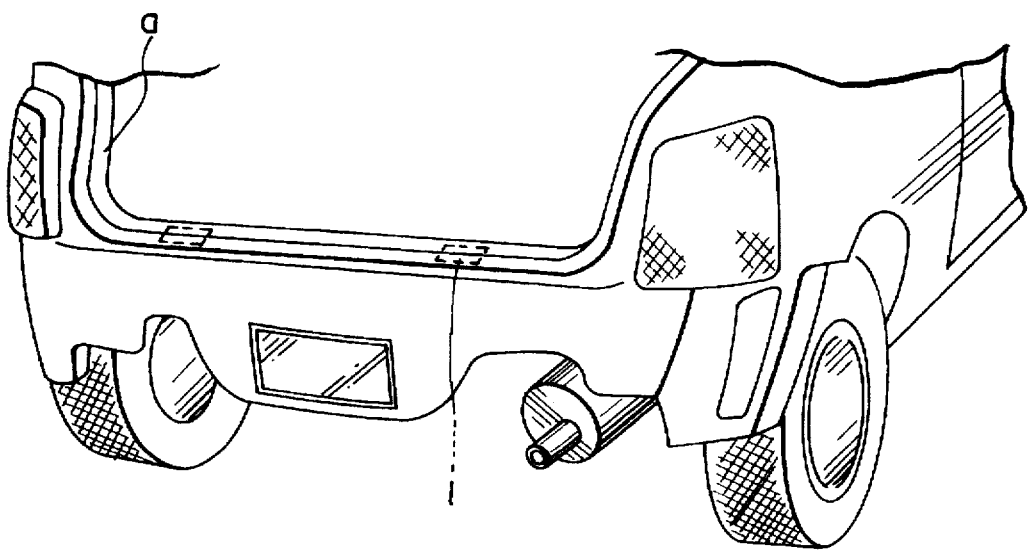
FIG. 10 is a fragmentary perspective view of the trunk compartment of a hatch-back automobile to which the drain clip of FIG. 1 is applied.
Figure 11:
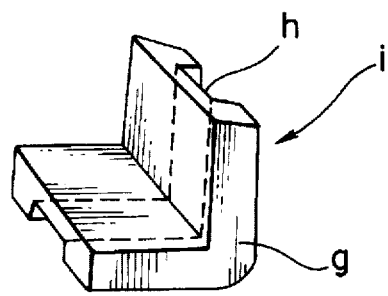
FIG. 11 is a perspective view of a conventional drain clip.

A drain clip 1 in a preferred embodiment according to the present invention is attached to a weather strip a attached as shown in FIG. 10 to the periphery of the trunk compartment of the body of an automobile to seal the joint of the body of the automobile and a trunk lid, a hatch cover in FIG. 10, in a water-tight fashion to drain water collected in the internal space of the weather strip a.

Referring to FIGS. 1 to 9, the drain clip 1 has, in an integral unit, a base part 2 having an L-shaped cross section, and a first leg and a second leg, and holding arms 3 projecting slightly obliquely inward, i.e., toward the side of the inner corner, and in opposite directions from the opposite side edges, respectively, of one of the legs thereof, i.e., the first leg.

Figure 4:
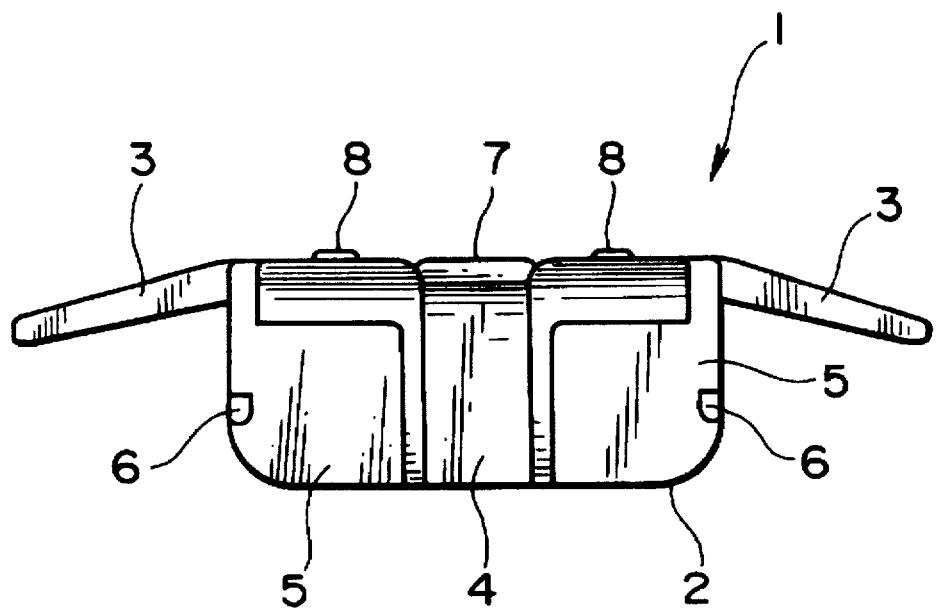
FIG. 4 is a bottom view of the drain clip of FIG. 1.
Figure 5:
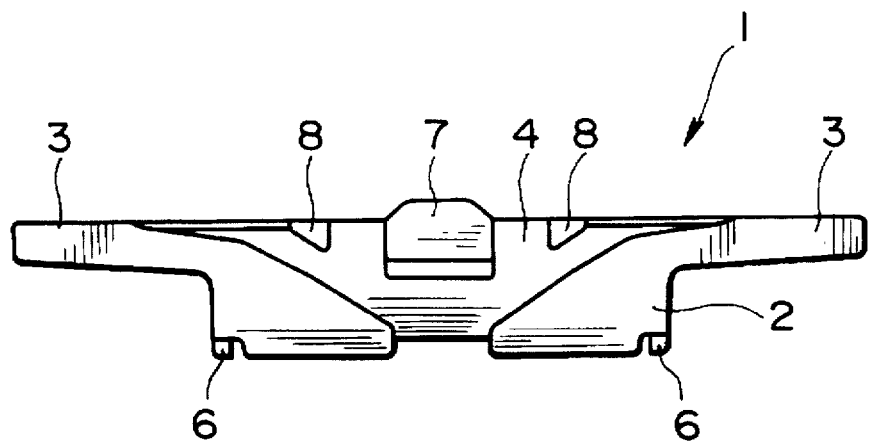
FIG. 5 is a rear view of the drain clip of FIG. 1.
Figure 6:
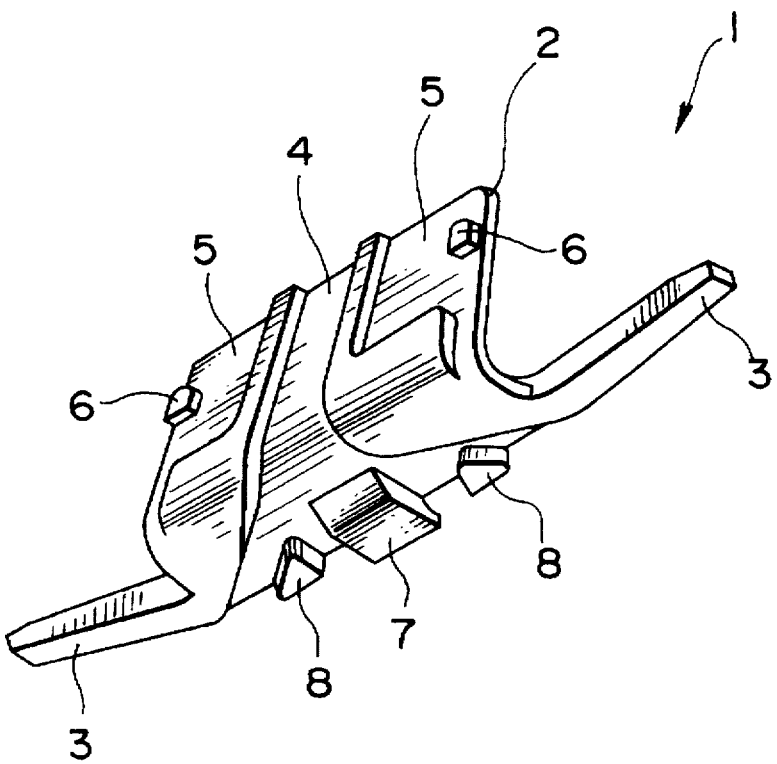
FIG. 6 is a perspective view of the drain clip of FIG. 1 as viewed from the back side thereof.

As shown in FIG. 6, a drain groove 4 is formed in the outer surface of the base part 2, i.e., the surface on the side of the outer corner, between the respective edges of the first and the second legs. One section of the drain groove 4 formed in the outer surface of the first leg of the base part 2 expands gradually toward the edge of the same leg in the shape of an inverted triangle and opens in the edge of the same edge as shown in FIG. 5, and the other section of the drain groove 4 formed in the outer surface of the second leg of the base part 2 has a fixed width and opens in the edge of the second leg as shown in FIG. 4. As shown in FIG. 6, portions 5 of the second leg on the opposite sides of the drain groove 4 have a reduced thickness substantially equal to that of a portion of the second leg corresponding to the drain groove 4, and projections 6 are formed in the portions 5 near the side edges of the second leg, respectively.

Figure 2:
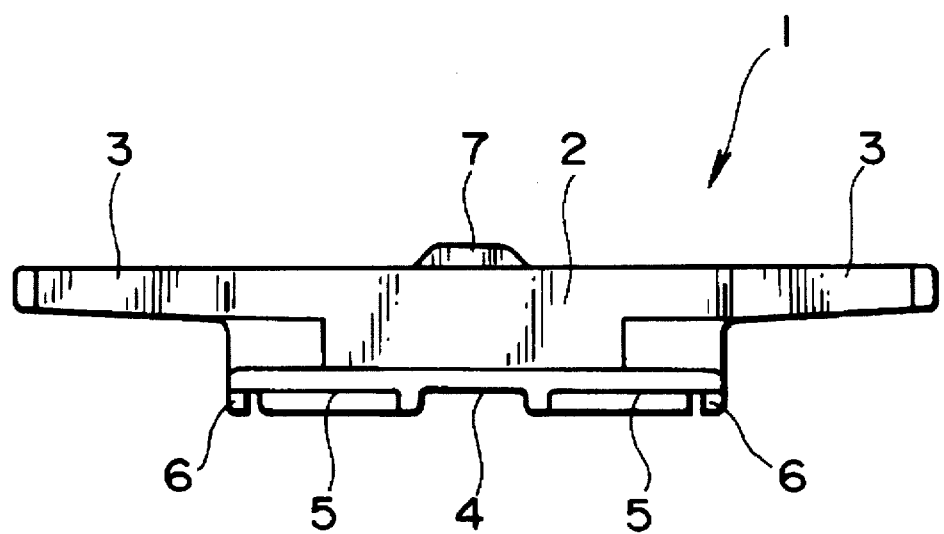
FIG. 2 is a front view of the drain clip of FIG. 1.
Figure 3:
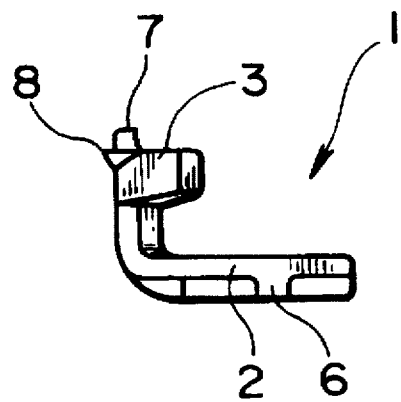
FIG. 3 is a side view of the drain clip of FIG. 1.

As shown in FIGS. 5 and 6, a turn-stop projection 7 is formed at the middle of the width of the drain groove 4 on the outer surface of the first leg of the base part 2, and tilting projections 8 are formed on the opposite sides, respectively, of the turn-stop projection 7 at a predetermined interval. The tip of the turn-stop projection 7 projects outward from the edge of the first leg of the base part 2 as shown in FIGS. 2, 3 and 5, and the tilting projections 8 project outward from thick portions of the back surface of the first leg of the base part 2 as shown in FIGS. 1, 3 and 4.

Figure 1:
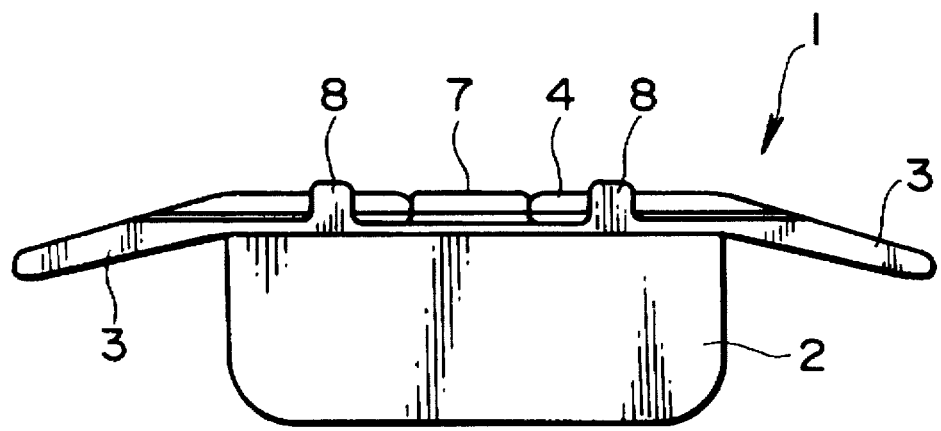
FIG. 1 is a plan view of a drain clip in a preferred embodiment according to the present invention for use in combination with a weather strip for an automobile.

As shown in FIGS. 1 and 4, the holding arms 3 are bar-shaped parts projecting slightly obliquely inward, i.e., toward the side of the inner corner of the L-shaped base part 2, and in opposite directions from the opposite side edges of the first leg of the base part 2, respectively.

Figure 9:
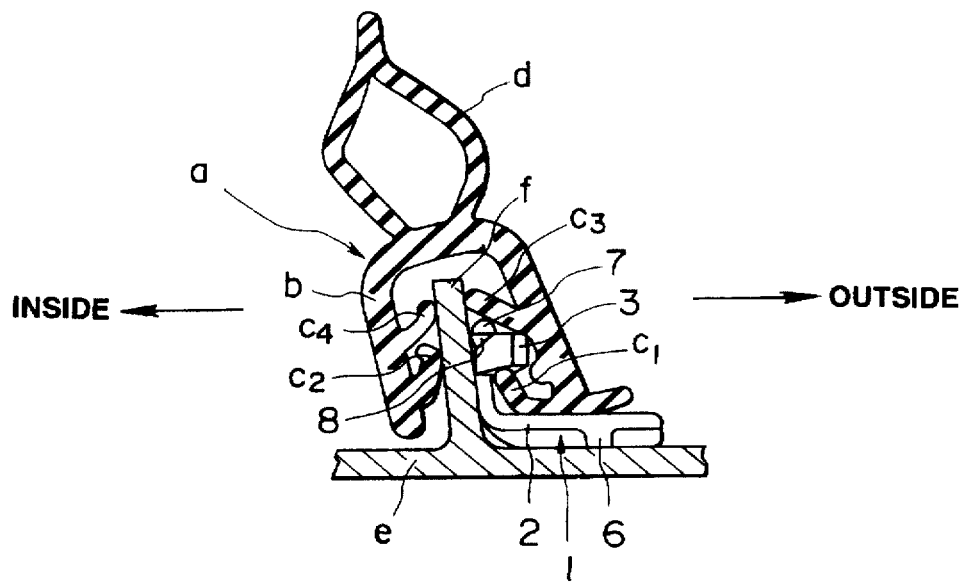
FIG. 9 is a sectional view of the weather strip combined with the drain clip of FIG. 1 as attached to the body of an automobile.

As shown in FIG. 9, the drain clip 1 is placed with the first leg of the base part 2 thereof inserted between the flange f of the body e of an automobile and the body part b of the weather strip a. The drain groove 4 (FIG. 6) formed in the outer surface of the base part 2 forms a drain passage, not shown in FIG. 9, connecting the internal space of the weather strip a attached to the body e of the automobile and the external environment to drain water collected in the internal space of the base part b of the weather strip a.

Figure 7:
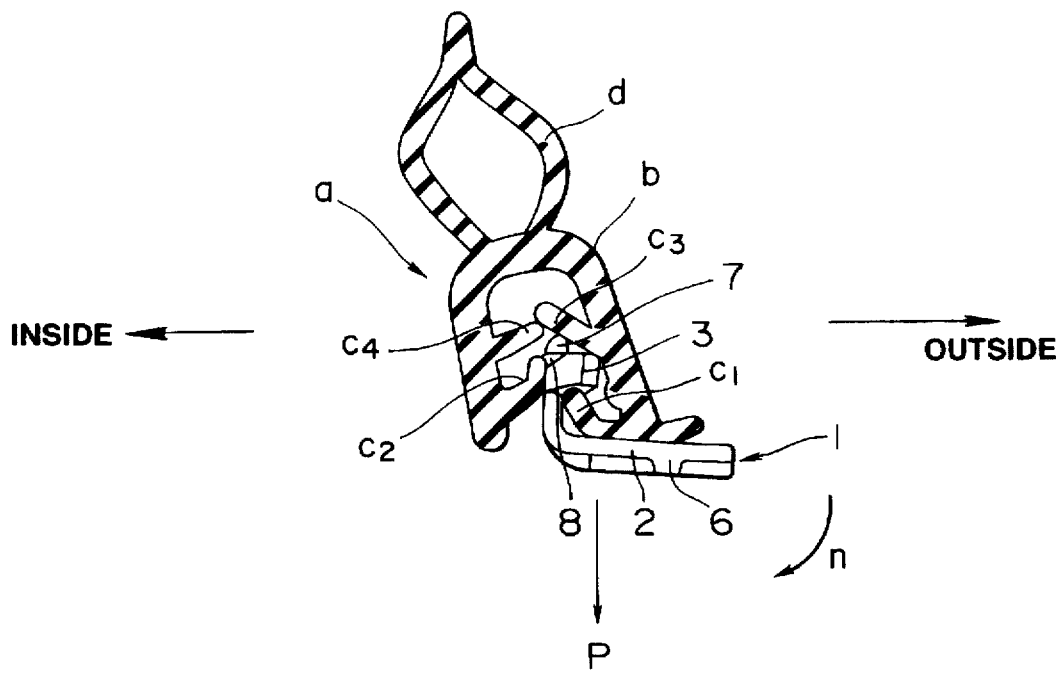
FIG. 7 is a sectional view of the drain clip of FIG. 1 as attached to a weather strip.
Figure 8:
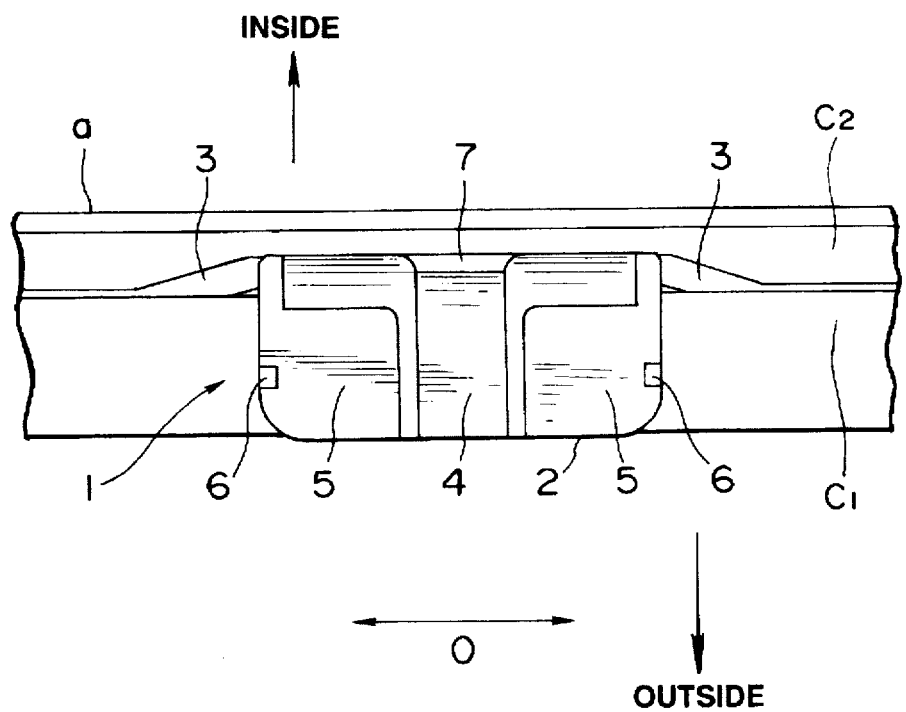
FIG. 8 is a bottom view of the drain clip of FIG. 1 as attached to the weather strip.
Figure 12:
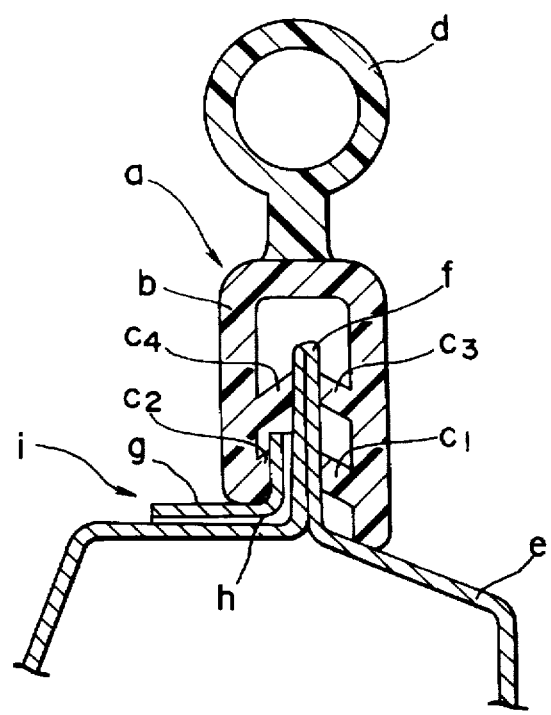
FIG. 12 is a sectional view of the drain clip of FIG. 11 used in combination with a weather strip on the body of an automobile.

The weather strip a, similarly to the conventional weather strip a shown in FIG. 12, is formed of rubber and has a base part b having a sectional shape resembling an inverted letter U and integrally provided with opposite holding lips c1, c2, c3 and c4 that hold to the flange f of the body e of the automobile, and a tubular sealing part d integrally joined to the upper wall of the body part b. In FIGS. 7 to 9, parts like or corresponding to those of the weather strip a shown in FIG. 12 are designated by the same reference characters.

When attaching the weather strip a to the flange f, first the drain clip 1 is attached to the weather strip a with the first leg of the base part 2 thereof inserted in the weather strip a, and then the weather strip a combined with the drain clip 1 is attached to the flange f of the body e of the automobile to provide the weather strip a with a draining structure.

As shown in FIGS. 7 and 8, when the first leg of the base part 2 of the drain clip 1 is inserted in the base part b of the weather strip a, the holding arms 3 (only one of the holding arms 3 is shown in FIG. 7) hold to the holding lip c1 formed on the lower part of the inner surface of the outer side wall of the body part b of the weather strip a to securely prevent the drain clip 1 from falling off the weather strip a in the direction of the arrow P in FIG. 7, and the tips of the holding arms 3 are pressed against the inner surface of the outer wall of the body part b of the weather strip a to prevent the drain clip 1 from being dislocated from a predetermined position in directions indicated by the arrows O in FIG. 8. Thus the drain clip 1 does not fall off the weather strip a and is not dislocated.

As shown in FIG. 7, the turn-stop projection 7 formed on the first leg of the base part 2 of the drain clip 1 runs onto the holding lip c3 projecting from the upper part of the inner surface of the outer side wall of the body part b to prevent the drain clip 1 from turning in the direction of the arrow n in FIG. 7 to avoid making it difficult to receive the flange f of the body e of the automobile into the body part b of the weather strip a.

When attaching the drain clip 1 to the weather strip a by inserting the first leg of the base part 2 in the body part b of the weather strip a, the tilting projections 8 come into contact with the holding lip c2 opposite the holding lip c1 of the weather strip a engaged with the holding arms 3 to bias the first leg of the base part 2 toward the outer side wall of the body part b of the weather strip a to press the holding arms 3 firmly against the holding lip c1, and to press the tips of the holding arms 3 against the inner surface of the outer side wall of the body part b. The turn-stop projection 7 of the drain clip 1 inhibits the excessive turning of the drain clip 1 to prevent making it difficult to attach the weather strip a to the flange f of the body e of the automobile.

Thus, the weather strip a combined with the drain clip 1 so as to form a draining structure can be securely and easily attached to the body e of the automobile without causing the drain clip 1 to fall off the weather strip a and to be dislocated, which enhances the efficiency of the work for attaching the weather strip a to the body e of the automobile.

The present invention is not limited in its practical application to the drain clip specifically described above and many modifications are possible. For example, the respective positions of the turn-stop projection 7 and the tilting projections 8 may be changed, the turn-stop projection 7 and the tilting projections 8 may be omitted. The respective shapes of the holding arms 3 and the drain groove 4 may be changed, and many changes and variations may be made in the drain clip described herein without departing from the scope of the invention.

As is apparent from the foregoing description, the drain clip of the present invention as attached to the weather strip for an automobile forms a drain passage connecting the internal space of the weather strip to the external environment to drain water collected in the internal space of the weather strip satisfactorily, can be securely attached to the weather strip at a predetermined position thereon so that the drain clip may not be dislocated or may not fall off the weather strip, and enhances the efficiency of the work for attaching the weather strip to the body of an automobile.

What is claimed is:

1. A drain clip in combination with a weather strip for an automobile, said automobile including a flange having faces directed to the inside of an automobile and the outside of an automobile, said weather strip including an internal space placed over and engaging the flange, said internal space defined by two inner surfaces each having inner holding lips extending therefrom, and said clip interposed between the outer face of the of the flange and the weather strip to drain water leaked into the weather strip attached to the flange of the body of the automobile, comprising, in an integral unit: a base part having an L-shaped cross section and provided in its outer surface facing inwardly of an automobile with a drain groove formed so as to extend from one to the other end of the L-shaped cross section; one of the legs of the L-shaped cross section of the drain clip being inserted between the flange of the body of the automobile and the weather strip to form a drain passage connecting the internal space of the weather strip and the external environment; and bar-shaped holding arms projecting slightly obliquely inward of the L-shaped cross section and outwardly relative to the automobile and in opposite directions from the opposite side edges of one of the legs of the base part, respectively, so as to be engaged with one of the inner holding lips of the weather strip with the tips of bar-shaped arms pressed against the inner surface of the weather strip.

2. A drain clip according to claim 1, wherein tilting projections are formed on the outer surface of one of the legs of the base part.

3. A drain clip according to claim 1, wherein a turn-stop projection is formed at the middle of the width of one of the legs of the base part so as to protrude from one end of the base part.

4. A drain clip according to claim 3, wherein tilting projections are formed on the outer surface of one of the legs of the base part.

5. A weather strip assembly comprising: a weather strip comprising, in an integral unit, a body part having a cross section resembling an inverted letter U, holding lips formed on the inner surfaces of the side walls of the U-shaped body part, and a sealing part joined to the upper surface of the body part; said weather strip adapted to be attached to the body of an automobile by receiving the flange of the body of the automobile in the body part with the holding lips holding to the flange; and a drain clip comprising, in an integral unit: a base part having an L-shaped cross section and provided in its outer surface of the L-shaped cross section with a drain groove formed so as to extend from one to the other end of the L-shaped cross section, one of the legs of the drain clip adapted to be inserted between the flange of the body of the automobile and the weather strip to form a drain passage connecting the internal space of the weather strip and the external environment, and bar-shaped holding arms projecting slightly obliquely inward of the L-shaped cross section and outwardly relative to the automobile and in opposite directions from the opposite side edges of one of the legs of the base part, respectively, so as to be engaged with one of the holding lips of the weather strip with the tips of the bar-shaped arms pressed against the inner surface of the weather strip; and attached to the weather strip with one of the legs of the base part inserted in the body part of the weather strip, with the holding arms in engagement with the holding lip formed in the lower part of the outer side wall of the body part of the weather strip and with the tips of the holding arms pressed against the inner surface of the outer side wall of the body part of the weather strip.

6. A weather strip assembly according to claim 5, wherein tilting projections are formed on the outer surface of one of the legs of the base part so as to be pressed against the holding lip formed on the inner surface of the outer side wall of the body part of the weather strip.

7. A weather strip assembly according to claim 5, wherein a turn-stop projection is formed at the middle of the width of one of the legs of the base part so as to protrude from one end of the base part and to be pressed against the inner surface of the outer side wall of the body part or the holding lip formed in the upper portion of the inner surface of the outer side wall of the body part of the weather strip.

8. A weather strip assembly according to claim 7, wherein tilting projections are formed on the outer surface of one of the legs of the base part so as to be pressed against the holding lip formed on the outer side wall of the body part of the weather strip.

* * * * *